United States Patent
Lundberg

(10) Patent No.: US 9,194,465 B2
(45) Date of Patent: Nov. 24, 2015

(54) HYDRAULIC CONTROL SYSTEM FOR A CONTINUOUSLY VARIABLE TRANSMISSION

(71) Applicant: GM Global Technology Operations LLC, Detroit, MI (US)

(72) Inventor: Philip C. Lundberg, Keego Harbor, MI (US)

(73) Assignee: GM Global Technology Operations, LLC, Detroit, MI (US)

(*) Notice: Subject to any disclaimer, the term of this patent is extended or adjusted under 35 U.S.C. 154(b) by 39 days.

(21) Appl. No.: 14/269,801

(22) Filed: May 5, 2014

(65) Prior Publication Data

US 2014/0357434 A1 Dec. 4, 2014

Related U.S. Application Data

(60) Provisional application No. 61/829,333, filed on May 31, 2013.

(51) Int. Cl.
| | |
|---|---|
| F16H 61/66 | (2006.01) |
| F16H 61/662 | (2006.01) |
| F16H 9/12 | (2006.01) |
| F16H 61/14 | (2006.01) |

(52) U.S. Cl.
CPC ............ *F16H 9/125* (2013.01); *F16H 61/14* (2013.01); *F16H 61/662* (2013.01); *F16H 61/66* (2013.01); *F16H 61/66259* (2013.01); *F16H 61/66272* (2013.01)

(58) Field of Classification Search
CPC ..................... F16H 61/66; F16H 61/66272
See application file for complete search history.

(56) References Cited

U.S. PATENT DOCUMENTS

| | | | | |
|---|---|---|---|---|
| 4,768,632 | A * | 9/1988 | Moan | 192/3.3 |
| 5,788,600 | A * | 8/1998 | Tsukamoto et al. | 477/45 |
| 7,025,706 | B2 * | 4/2006 | Katou | 477/45 |
| 8,435,148 | B2 | 5/2013 | Moorman | |
| 2004/0063525 | A1 * | 4/2004 | Ochiai et al. | 474/28 |
| 2004/0063526 | A1 * | 4/2004 | Nobu | 474/28 |
| 2004/0063543 | A1 * | 4/2004 | Wakayama | 477/175 |
| 2013/0319155 | A1 | 12/2013 | Berger | |
| 2013/0327172 | A1 | 12/2013 | Berger et al. | |
| 2013/0333508 | A1 | 12/2013 | Lundberg et al. | |
| 2014/0123799 | A1 | 5/2014 | Landino et al. | |

* cited by examiner

*Primary Examiner* — Tisha Lewis

(57) ABSTRACT

A hydraulic control system for a CVT includes a pressure regulator subsystem, a ratio control subsystem, a torque converter control (TCC) subsystem, a clutch control subsystem, and is enabled for automatic engine start/stop (ESS) functionality.

18 Claims, 6 Drawing Sheets

HYDRAULIC CONTROL SYSTEM FOR A CONTINUOUSLY VARIABLE TRANSMISSION

CROSS-REFERENCE TO RELATED APPLICATIONS

This application claims the benefit of U.S. Provisional Application No. 61/829,333 filed May 31, 2013. The disclosure of the above application is incorporated herein by reference.

TECHNICAL FIELD

The invention relates to a control system for a continuously variable transmission, and more particularly to an electro-hydraulic control system having improved torque converter control and engine automatic stop/start for a continuously variable transmission.

BACKGROUND

A typical continuously variable transmission (CVT) includes a hydraulic control system that is employed to provide cooling and lubrication to components within the CVT and to actuate torque transmitting devices such as drive clutches or torque converter clutches, and belt pulley positions. The conventional hydraulic control system typically includes a main pump that provides a pressurized fluid, such as oil, to a plurality of valves and solenoids within a valve body. The main pump is driven by the engine of the motor vehicle. The valves and solenoids are operable to direct the pressurized hydraulic fluid through a hydraulic fluid circuit to various subsystems including lubrication subsystems, cooler subsystems, torque converter clutch control subsystems, and shift actuator subsystems that include actuators that engage the torque transmitting devices and the pulleys that move the belt of the CVT. The pressurized hydraulic fluid delivered to the pulleys is used to position the belt relative to input and output variators in order to obtain different gear ratios.

While previous hydraulic control systems are useful for their intended purpose, the need for new and improved hydraulic control system configurations within CVT's which exhibit improved performance, especially from the standpoints of efficiency, responsiveness and smoothness, is essentially constant. Accordingly, there is a need for an improved, cost-effective hydraulic control system for use in a hydraulically actuated CVT.

SUMMARY

A hydraulic control system for a CVT is provided. The hydraulic control system includes a pressure regulator subsystem, a ratio control subsystem, a torque converter control (TCC) subsystem, a clutch control subsystem, and is enabled for automatic engine start/stop (ESS) functionality.

For example, a hydraulic control system for a powertrain in a motor vehicle is provided where the powertrain has a torque converter with a torque converter clutch (TCC) connectable with a continuously variable transmission, and the transmission has a primary moveable pulley and a secondary moveable pulley. The hydraulic control system includes a pressure regulator subsystem providing a pressurized hydraulic fluid, a pulley ratio control subsystem in downstream fluid communication with the pressure regulator subsystem and configured to control the pressurized hydraulic fluid to the primary moveable pulley and the secondary moveable pulley, a TCC regulator valve assembly in downstream fluid communication with the pressure regulator subsystem, and a control valve assembly. The control vale assembly includes a TCC apply port connected to an apply side of the TCC, a TCC release port connected to a release side of the TCC, a first feed port connected directly to the pressure regulator subsystem, and a second feed port connected directly to the TCC regulator valve assembly. The control valve assembly includes a control spool moveable between an apply position and a release position, wherein in the apply position the TCC apply port communicates with the second feed port and in the release position the TCC release port communicates with the first feed port.

In another example of the present invention, the hydraulic control system includes a fault valve assembly having a first port in direct communication with a third feed port in the control valve assembly, a second port in direct communication with the pressure regulator subsystem and in direct communication with the first feed port of the control valve assembly, and an exhaust port, wherein the fault valve assembly includes a fault spool moveable between an open position and a closed position, wherein when in the open position the first port is in communication with the second port and when in the closed position the first port is in communication with the exhaust port. The third feed port of the control valve assembly is in communication with the TCC release port when the control valve is in both the apply position and the release position.

In yet another example of the present invention, the TCC regulator valve assembly includes an inlet port in downstream fluid communication with the pressure regulator subsystem and an outlet port in direct communication with the second feed port of the control valve assembly, and the TCC regulator valve includes a regulator spool that moves to regulate the fluid pressure from the inlet port to the outlet port.

In yet another example of the present invention, a TCC control solenoid is in direct fluid communication with the control valve, the fault valve, and the regulator valve.

In yet another example of the present invention, a pressure signal from the TCC control solenoid moves the control valve to the apply position and the fault valve to the closed position, and a first biasing member biases the control valve towards the release position and a second biasing member biases the fault valve towards the open position.

In yet another example of the present invention, the control valve assembly further includes a cooler port in direct communication with a cooler subsystem, and the cooler port is in communication with the first feed port when the control valve is in the apply position and wherein the cooler port is in communication with the TCC apply port when the control valve is in the release position.

In yet another example of the present invention, the pressure regulator subsystem includes an engine driven pump, a pressure regulator valve assembly in downstream fluid communication with the engine driven pump, and an accumulator.

In yet another example of the present invention, the pressure regulator valve assembly includes a main inlet port that receives pressurized hydraulic fluid from the engine driven pump, a TCC outlet port in direct communication with the first feed port of the control valve assembly, and a pressure regulator valve that controls the pressure of hydraulic fluid from the main inlet port to the TCC outlet port.

In yet another example of the present invention, an accumulator solenoid disposed downstream of the accumulator, and wherein the accumulator solenoid and pressure regulator valve assembly are both in direct upstream fluid communication with the pulley ratio control subsystem.

In yet another example of the present invention, the pulley ratio control subsystem includes a primary pulley valve in upstream fluid communication with the primary moveable pulley and a secondary pulley valve in upstream fluid communication with the secondary moveable pulley.

In yet another example of the present invention, the hydraulic control system includes a primary pulley solenoid in direct communication with the primary pulley valve for controlling a position of the primary pulley valve and a secondary pulley solenoid in direct communication with the secondary pulley valve for controlling a position of the secondary pulley valve.

In yet another example of the present invention, a pressure regulator solenoid is in direct communication with the pressure regulator valve for controlling a position of the pressure regulator valve.

In yet another example of the present invention, a three-way check valve is in direct downstream fluid communication with the primary pulley solenoid and the secondary pulley solenoid, wherein the three-way check valve has an outlet that communicates with the pressure regulator valve and a higher pressure of the pressurized hydraulic fluid from the primary pulley solenoid and the secondary pulley solenoid controls the position of the pressure regulator valve.

In yet another example of the present invention, the engine driven pump includes an outlet in communication with the pressure regulator valve assembly and with a bypass piston, a first inlet in communication with a sump, and a second inlet in communication with the bypass piston, wherein the bypass piston allows fluid communication from the outlet to the second inlet when a force acting on the bypass piston exceeds a threshold.

In yet another example of the present invention, a clutch control subsystem is included for controlling a forward drive torque transmitting device and a reverse torque transmitting device, wherein the clutch control subsystem includes a forward actuator, a reverse actuator, and a manual valve disposed upstream of the forward and reverse actuators and downstream of the pressure regulator subsystem.

Further aspects and advantages of the present invention will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1A:
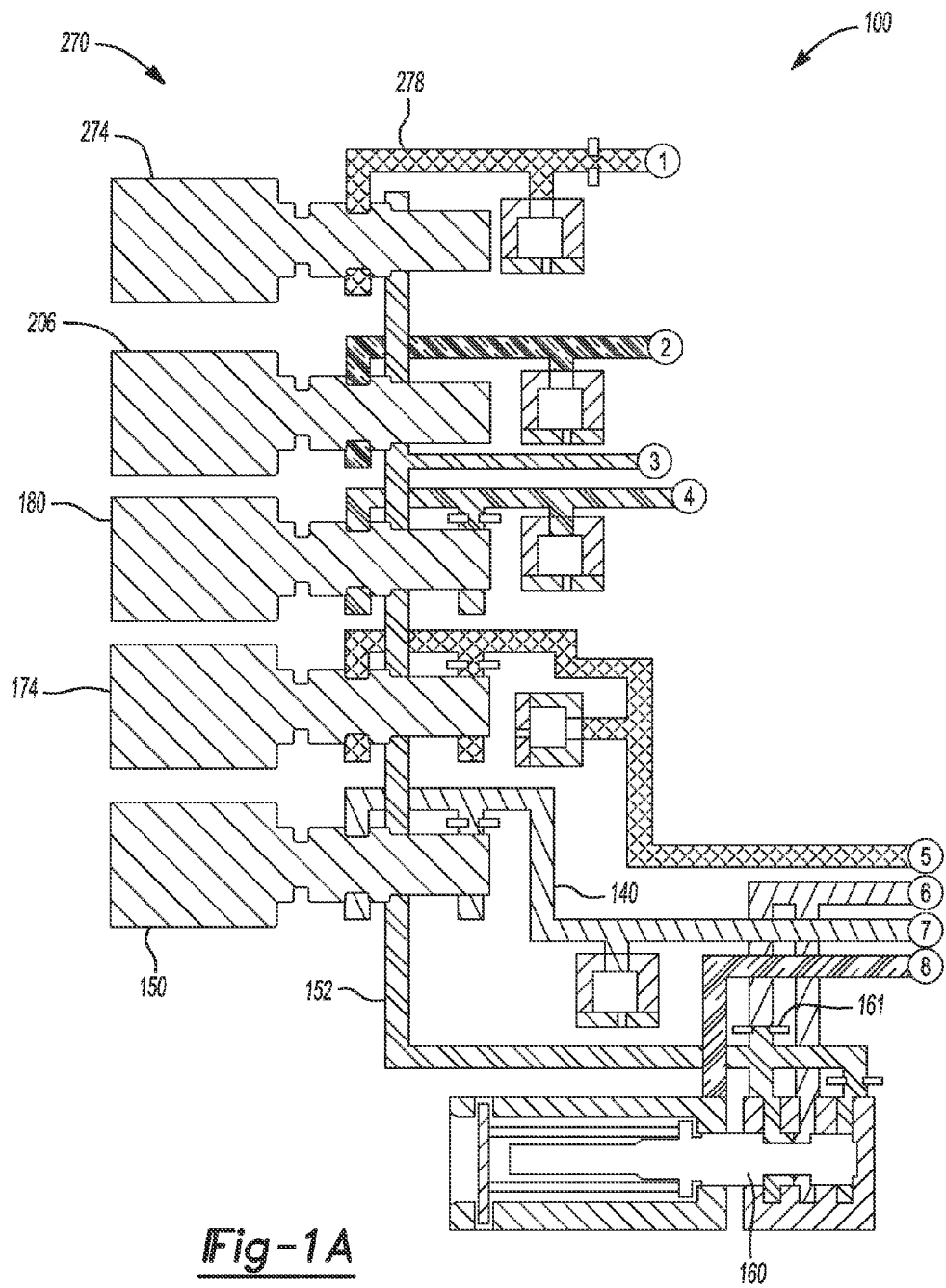
FIG. 1A is a diagram of a portion of a hydraulic control system according to the principles of the present invention.
Figure 1B:
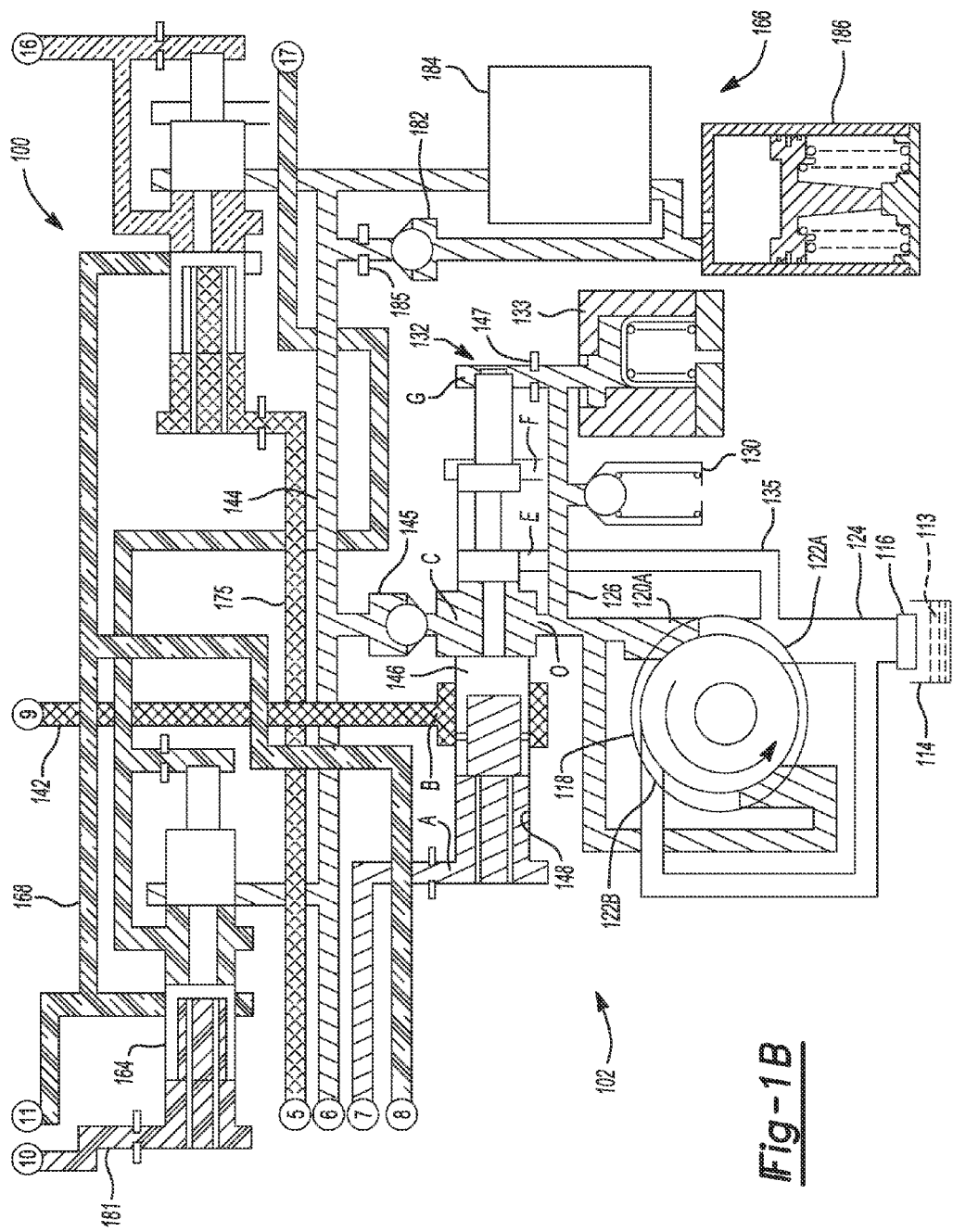
FIG. 1B is a diagram of another portion of the hydraulic control system according to the principles of the present invention.
Figure 1C:
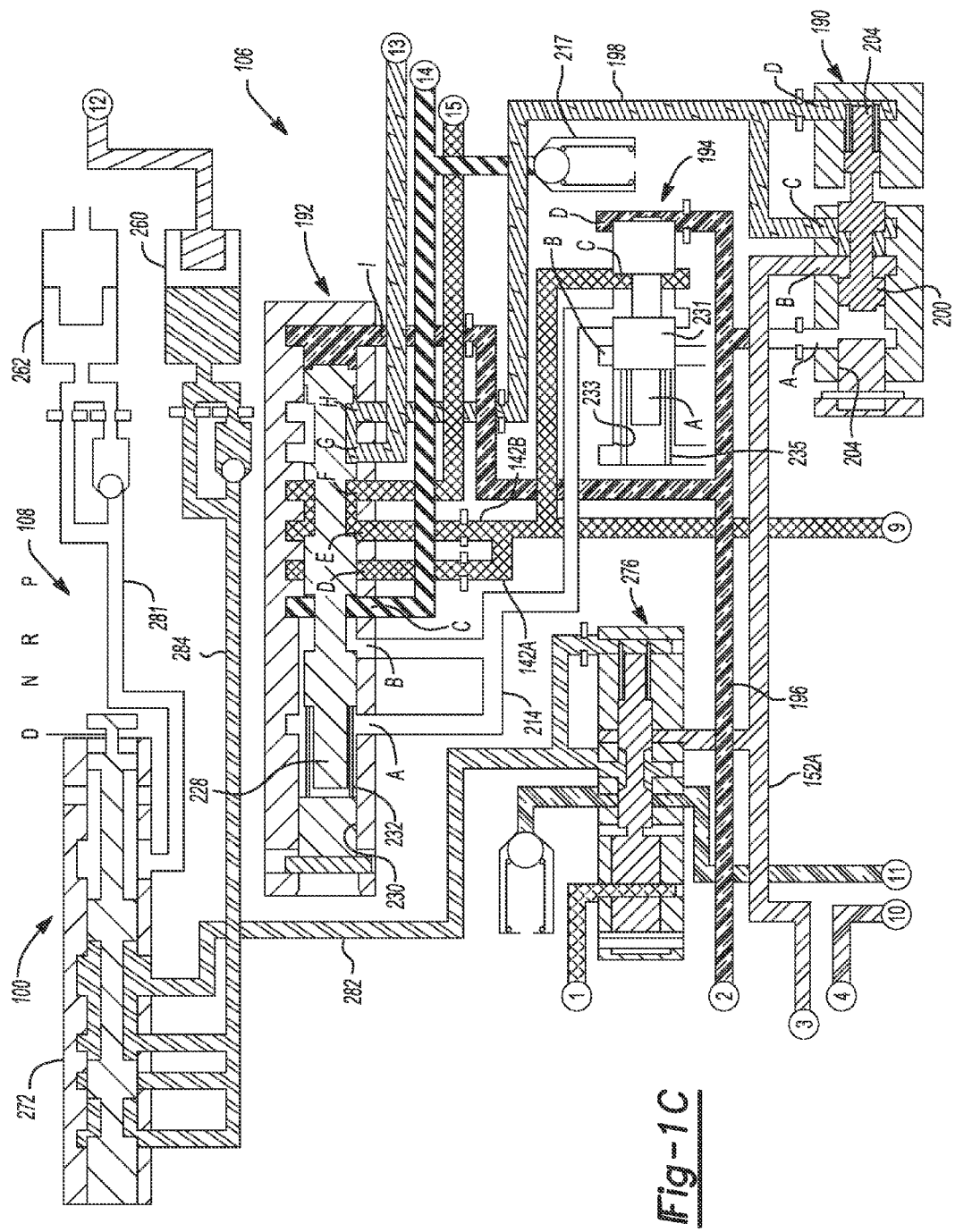
FIG. 1C is a diagram of another portion of the hydraulic control system according to the principles of the present invention.
Figure 1D:
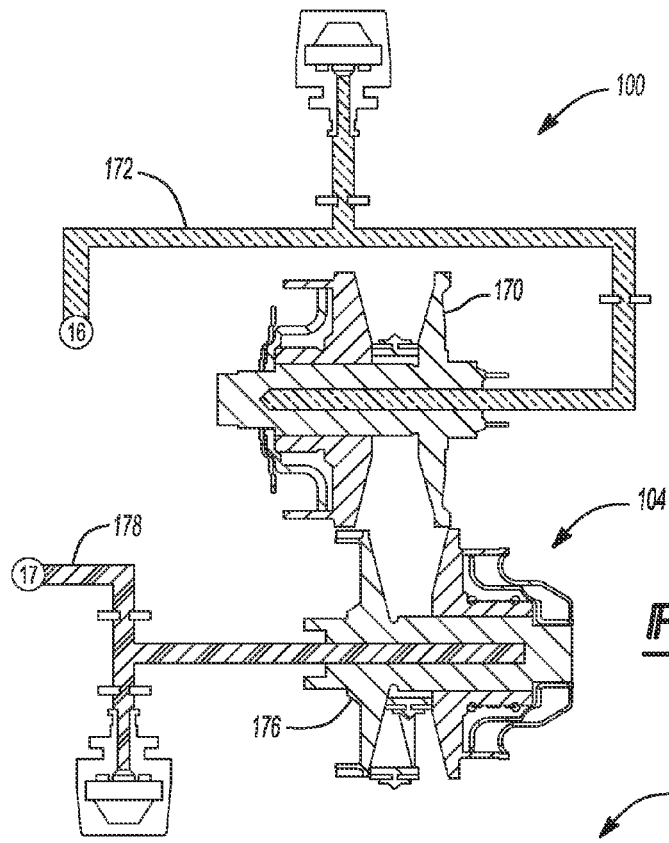
FIG. 1D is a diagram of another portion of the hydraulic control system according to the principles of the present invention.
Figure 1E:
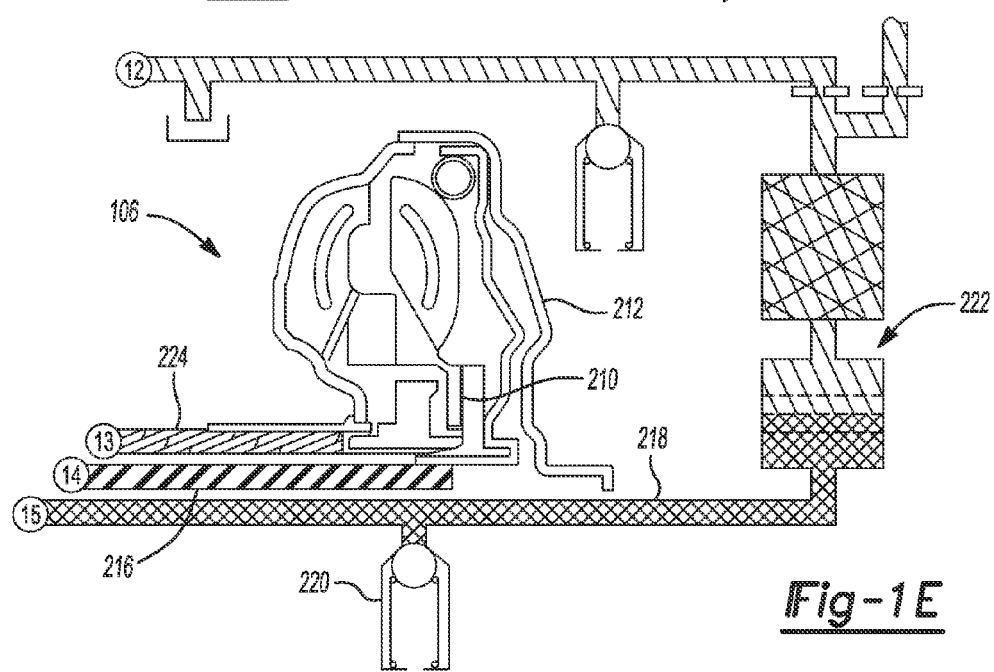
FIG. 1E is a diagram of another portion of the hydraulic control system according to the principles of the present invention.

With reference to FIGS. 1A-1E, a hydraulic control system according to the principles of the present invention is generally indicated by reference number 100. The hydraulic control system 100 includes a plurality of interconnected or hydraulically communicating circuits or subsystems including a pressure regulator subsystem 102, a ratio control subsystem 104, a torque converter control (TCC) subsystem 106, and a clutch control subsystem 108

The pressure regulator subsystem 102 is operable to provide and regulate pressurized hydraulic fluid 113, such as oil, throughout the hydraulic control system 100. The pressure regulator subsystem 102 draws hydraulic fluid 113 from a sump 114. The sump 114 is a tank or reservoir preferably disposed at the bottom of a transmission housing to which the hydraulic fluid 113 returns and collects from various components and regions of the transmission. The hydraulic fluid 113 is forced from the sump 114 and communicated through a sump filter 116 and throughout the hydraulic control system 100 via a pump 118. The pump 118 is preferably driven by an engine (not shown) and may be, for example, a gear pump, a vane pump, a gerotor pump, or any other positive displacement pump. In one example, the pump 118 includes outlet ports 120A and 1208 and an inlet ports 122A and 122B. The inlet ports 122A and 122B communicate with the sump 114 via a suction line 124. The outlet ports 120A and 120B communicate pressurized hydraulic fluid 113 to a supply line 126.

The supply line 126 communicates hydraulic fluid from the pump 118 to a spring biased blow-off safety valve 130, to a pressure regulator valve 132, and to an optional accumulator 133. The safety valve 130 is set at a relatively high predetermined pressure and if the pressure of the hydraulic fluid in the supply line 126 exceeds this pressure, the safety valve 130 opens momentarily to relieve and reduce the pressure of the hydraulic fluid.

The pressure regulator valve 132 is configured to bleed off pressure from the main supply line 126 to a return line 135. The return line 135 communicates with the suction line 124. The pressure regulator valve 132 includes ports 132A-G. Port 132A is in communication with a signal fluid line 140. Port 132B is in communication with a TCC feed line 142. Ports 132C is in communication with a main supply line 144 through a one-way check valve 145. Port 132D is in communication with the supply line 126. Port 132E is in communication with the bypass line 135. Port 132F is an exhaust port and is in communication with the sump 114 or an exhaust backfill circuit. Port 132G is in communication with the supply line 126 through a flow restriction orifice 147.

The pressure regulator valve 132 further includes a spool 146 slidably disposed within a bore 148. The pressure regulator valve 132 also provides hydraulic fluid to the TCC feed line 142. The spool 146 automatically changes position to dump excess flow from the supply line 126 to the TCC feed line 142 and then additional excess flow to the return line 135 until a pressure balance is achieved between a commanded pressure and the actual pressure. The spool 146 is modulated by a line pressure control solenoid 150 that communicates with the signal line 140. The line pressure control solenoid 150 receives hydraulic fluid from a solenoid feed line 152 and is preferably a low flow, normally high variable force solenoid. The solenoid 150 commands a fluid pressure by sending pressurized hydraulic fluid to port 132A to act on the spool 146. Simultaneously, fluid pressure from the main fluid line 126 enters port 132G and acts on the opposite side of the spool 146. Pressure balance between the commanded pressure from the solenoid 150, pressure within the main supply line 126 and a spring 153 is achieved as the spool 146 moves and allows selective communication between port 132D and port 132E and port 132D and port 132C and port 132D and port 132B. Under higher pressure from the pump 118, the pressure regulator valve fully strokes and pressure bleeds from port 132D to port 132B to feed the TCC subsystem 106 while fully opening to port 132E. However, the TCC subsystem 106 can be fully fed without opening port 132E. Port 132E only opens up if line pressure needs to be reduced after fully opening converter feed port 132B.

The main supply line 144 communicates hydraulic fluid from the pressure regulator valve 132 to an actuator feed limit valve 160, a first or primary pulley valve 162, a secondary pulley valve 164, and a ESS subsystem 166. The one way valve 145 prevents hydraulic flow into the main pump 118 when the main pump 118 is non-operational.

The actuator feed limit valve 160 is connected between the main supply line 144 and the solenoid feed line 152. The actuator feed limit valve 160 limits the maximum pressure of the hydraulic fluid supplied to the solenoid feed line 152 by selectively closing a direct connection between the main supply line 144 and the solenoid feed line 152 and forcing the main supply line 144 to communicate with the solenoid feed line 152 through a flow restriction orifice 161. The actuator feed limit valve 160 exhausts to a backfill circuit 168 that communicates with a blow-off valve 169. The blow-off valve 169 is set at a predetermined pressure and if the pressure of the hydraulic fluid in the backfill circuit 168 exceeds this pressure, the blow-off valve 169 opens momentarily to relieve and reduce the pressure of the hydraulic fluid.

The primary pulley valve 162 and the secondary pulley valve 164 form part of the ratio control subsystem 104. The primary pulley valve 162 selectively controls hydraulic fluid flow from the main supply line 144 to a primary pulley 170 via a primary pulley feed line 172. The primary pulley valve 162 is modulated by a primary pulley control solenoid 174 that communicates with a signal line 175. The primary pulley control solenoid 174 receives hydraulic fluid from the solenoid feed line 152 and is preferably a normally high variable force solenoid. The solenoid 172 commands a primary pulley position by sending pressurized hydraulic fluid to act on the primary pulley valve 162 which in turn controls the amount of hydraulic fluid from the main supply line to the primary pulley 170. The primary pulley valve 162 exhausts into the exhaust backfill circuit 168.

The secondary pulley valve 164 selectively controls hydraulic fluid flow from the main supply line 144 to a secondary pulley 176 via a secondary pulley feed line 178. The secondary pulley valve 164 is modulated by a secondary pulley control solenoid 180 that communicates with a signal line 181. The secondary pulley control solenoid 180 receives hydraulic fluid from the solenoid feed line 152 and is preferably a normally high variable force solenoid. The solenoid 180 commands a secondary pulley position by sending pressurized hydraulic fluid to act on the secondary pulley valve 164 which in turn controls the amount of hydraulic fluid from the main supply line to the secondary pulley 176. The secondary pulley valve 164 exhausts into the exhaust backfill circuit 168. Translation of the pulleys 170, 176 correlates to movement of a belt (not shown) in the CVT which varies the output or gear ratio of the CVT.

The ESS subsystem 166 provides hydraulic fluid pressure to the main supply line 144 during an automatic engine stop/start event where the engine is automatically shut off during certain operating conditions. During this event, the engine driven pump 118 is also shut off, thereby leading to a drop in pressure within the main supply line 144. The exhaust backfill circuit 168 minimizes the drain out of the main supply line 144. However, during engine restart, lag in pump operation can lead to unwanted shift delay. The ESS subsystem 166 assures immediate pressure to certain systems. The ESS subsystem 166 includes a one-way valve 182, an on/off solenoid 184, a flow restriction orifice 185, and an accumulator 186. The one-way valve 182 is connected to the main supply line 144 through orifice 185 and to an accumulator line 188. The one-way valve 182 allows fluid flow from the main supply line 144 to the accumulator line 188. The on/off solenoid 184 is disposed in parallel with the one-way valve 182 and communicates between the main supply line 144 and the accumulator line 188. The on/off solenoid 184 opens to release the stored fluid within the accumulator 186. The accumulator 186 is connected to the accumulator line 188. The accumulator 186 is an energy storage device in which the non-compressible hydraulic fluid 113 is held under pressure by an external source. In the example provided, the accumulator 186 is a spring type or gas filled type accumulator having a spring or compressible gas or both that provides a compressive force on the hydraulic fluid 113 within the accumulator 186. However, it should be appreciated that the accumulator 186 may be of other types, such as a gas-charged type, without departing from the scope of the present invention. As noted above, the accumulator 186 is charged through the one-way valve 182 and orifice 185 during normal operation of the CVT. The accumulator 186 is released when the solenoid 184 is opened during the start phase of an engine stop/start event.

The TCC subsystem 106 includes a TCC regulator valve 190, a converter control valve 192, and a TCC fault valve 194. The TCC regulator valve 190 includes ports 190A-D. Port 190A communicates with a signal line 196. Port 190B communicates with a branch 152A of the solenoid supply line 152. Port 190C communicates with a converter feed line 198. Port 190D is the feedback port and communicates with converter feed line 198.

The TCC regulator valve 190 further includes a spool 200 slidably disposed within a bore 202. The spool 200 is biased (i.e. de-stroked) by a spring 204. The spool 200 automatically changes position to regulate flow from the solenoid supply line 152A to the converter feed line 198 until a pressure balance is achieved between a commanded pressure and the actual pressure. The commanded pressure is commanded by a TCC regulation solenoid 206. The spool 146 is modulated by the TCC regulation solenoid 206 that communicates a hydraulic fluid signal to the signal line 196. The TCC regulation solenoid 206 receives hydraulic fluid from the solenoid feed line 152 and is preferably a low flow, normally low variable force solenoid. The solenoid 206 commands a fluid pressure by sending pressurized hydraulic fluid to port 190A to act on the spool 200. Simultaneously, fluid pressure from the converter feed line 198 enters port 190D and acts on the opposite side of the spool 200. Pressure balance between the commanded pressure from the solenoid 206, pressure within the converter feed line 198 and the spring 204 is achieved as the spool 200 moves and allows selective communication between port 190B and 190C. It should be appreciated that solenoid 206 and valve 190 can become a single high flow, normally low variable force solenoid without departing from the scope of the present invention.

The TCC control valve 192 controls the engagement of a torque converter clutch 210 within a torque converter 212. The TCC control valve 192 includes ports 192A-1. Ports 192A and 192B communicate with a fault feed line 214. Port 192C communicates with a TCC release line 216. The TCC release line 216 communicates with a blow-off valve 217 and releases the torque converter clutch 210 when pressurized hydraulic fluid is received. Ports 192D and 192E communicate with parallel branches 142A and 142B of the TCC feed line 142. Port 192F communicates with a cooler line 218. The cooler line 218 communicates with a blow-off valve 220 and an oil cooler subsystem 222. Port 192G communicates with a TCC apply line 224. The TCC apply line 224 applies the torque converter clutch 210 when pressurized hydraulic fluid is received. Port 192H communicates with the converter feed line 198. Port 192I communicates with the signal line 196.

The TCC control valve 192 includes a spool 228 slidably disposed within a bore 230. The TCC control valve 192 is controlled by the TCC regulation solenoid 206 via the signal line 196. The TCC regulation solenoid 206 toggles the spool 228 between an "apply" and "release" state. In the "apply" state the spool 228 is moved to the left against the bias of a spring 232 and the apply line 224 is fed hydraulic fluid from the converter feed line 198 via communication of ports 192G and 192H. In the "apply" state port 192E communicates with port 192F to supply fluid from the feed line 142 to the cooler line 218 while port 192B exhausts the converter 210 through the fault feed line 214 and the fault valve 194. In the "release" state the spool 228 is moved to the right (i.e. stroked by the spring 232) and port 192G communicates with port 192F to communicate the hydraulic fluid within the apply line 224 to the cooler line 218. In the "release" state port 192D communicates with port 192C to communicate hydraulic fluid from the converter feed line 142 to the release line 216 and port 192B is closed.

The TCC fault valve 194 assures that hydraulic fluid is provided to the release line to keep the torque converter 212 filled with hydraulic fluid. The TCC fault valve 194 includes ports 194A-D. Port 194A is an exhaust port that communicates with the sump 114. Port 192B communicates with the fault feed line 214. Port 194C communicates with a branch 142C of the converter feed line 142. Port 194D communicates with the signal line 196.

The TCC fault valve 194 includes a spool 231 slidably disposed within a bore 233. The position of the spool 231 is controlled by a signal received from the TCC regulation solenoid 206 via port 194D. The spool 231 moves between a first position and a second position. In the first position the spool 231 is moved to the right by the bias of a spring 235 and port 194C allows fluid communication between the converter feed line 142 and the fault line 214, thereby pressurizing the converter assuring that hydraulic fluid is available to the release line 216 in the unlikely event that the spool 228 of the TCC control valve 192 sticks in the "apply" state. In the second position the spool 231 is moved to the left against the bias of the spring 235 and port 194C is closed and 194A is open to exhaust. By opening exhaust port 194A, fluid is exhausted from the converter feed line 142.

The clutch control subsystem 108 controls engagement of a Drive clutch actuator 260 and a Reverse clutch actuator 262. The Drive clutch actuator 260 and the Reverse clutch actuator 262 are controlled by a solenoid valve assembly 270 and a manual valve 272. The solenoid valve assembly 270 includes a clutch control solenoid 274 and a regulator valve 276. The solenoid 274 receives hydraulic fluid from the solenoid supply line 152 and is connected to a signal line 278. The regulator valve 276 is fed oil from the branch 152A of the solenoid supply line 152. The clutch control solenoid 274 is preferably a low flow, normally low variable flow solenoid. The solenoid 274 selectively communicates the oil to the signal line 278 in order to move the regulator valve 276. The regulator valve 276 in turn selectively communicates the oil from the solenoid supply line 152A to a feed line 282. It should be appreciated that solenoid 275 and valve 276 can become a single high flow, normally low variable force solenoid without departing from the scope of the present invention.

The manual valve 272 communicates with the feed line 282, a Reverse line 281, and with a Drive line 284. Movement of a range selector of an operator of the motor vehicle in turn translates the manual valve 272 between various positions including a Reverse position and a Drive position. In the Drive position, the feed line 282 communicates with the Drive line 284. In the Reverse position the feed line 282 communicates with the Reverse line 281. The Drive line 282 communicates with the Drive clutch actuator 260 while the Reverse line 281 communicates with the Reverse clutch actuator 260.

Figure 2:
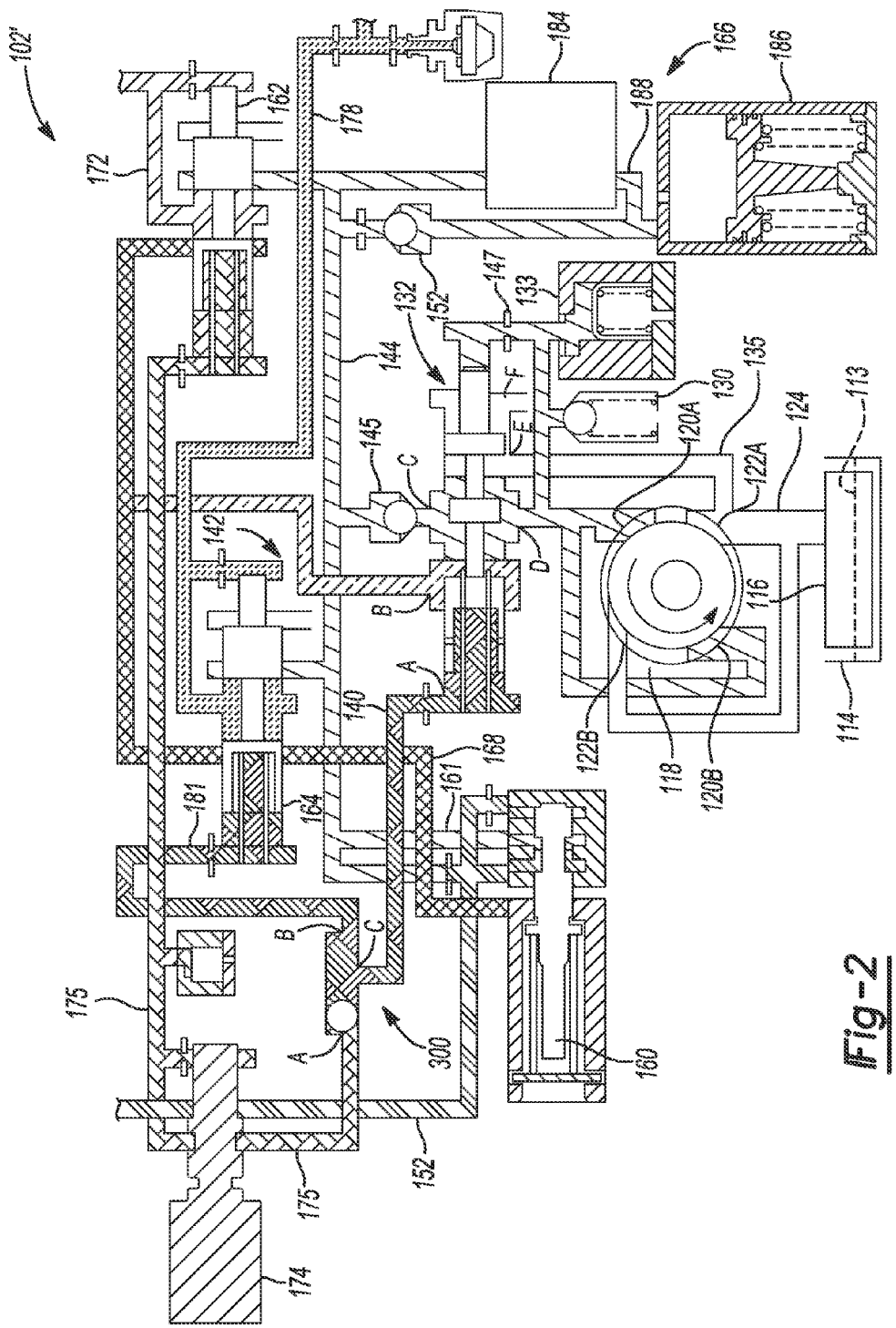
FIG. 2 is a diagram of a portion of an alternate embodiment of the hydraulic control system according to the principles of the present invention.

Turning now to FIG. 2, an alternate pressure regulator subsystem is generally indicated by reference number 102'. The pressure regulator subsystem 102' shares common components with the pressure regulator subsystem 102 shown in FIG. 1 and therefore like components have been indicated by like reference numbers. However, in the pressure regulator subsystem 102', the line pressure control solenoid 150 shown in FIG. 1 has been replaced by a check valve 300. The check valve 300 has ports 300A-C. Port 300A communicates with the signal line 175 either directly or through the primary pulley control solenoid 174. Port 300B communicates with the signal line 181 or the secondary pulley control solenoid 180. Port 300C communicates with the signal line 140. The check valve 300 allows fluid communication from either port 300A and 300B, whichever provides the higher pressure, to port 300C. Therefore, a commanded pressure of the pressure regulator valve 132 is controlled by the pressure signal from either of the primary pulley solenoid 174 or the secondary pulley solenoid 180.

Figure 3:
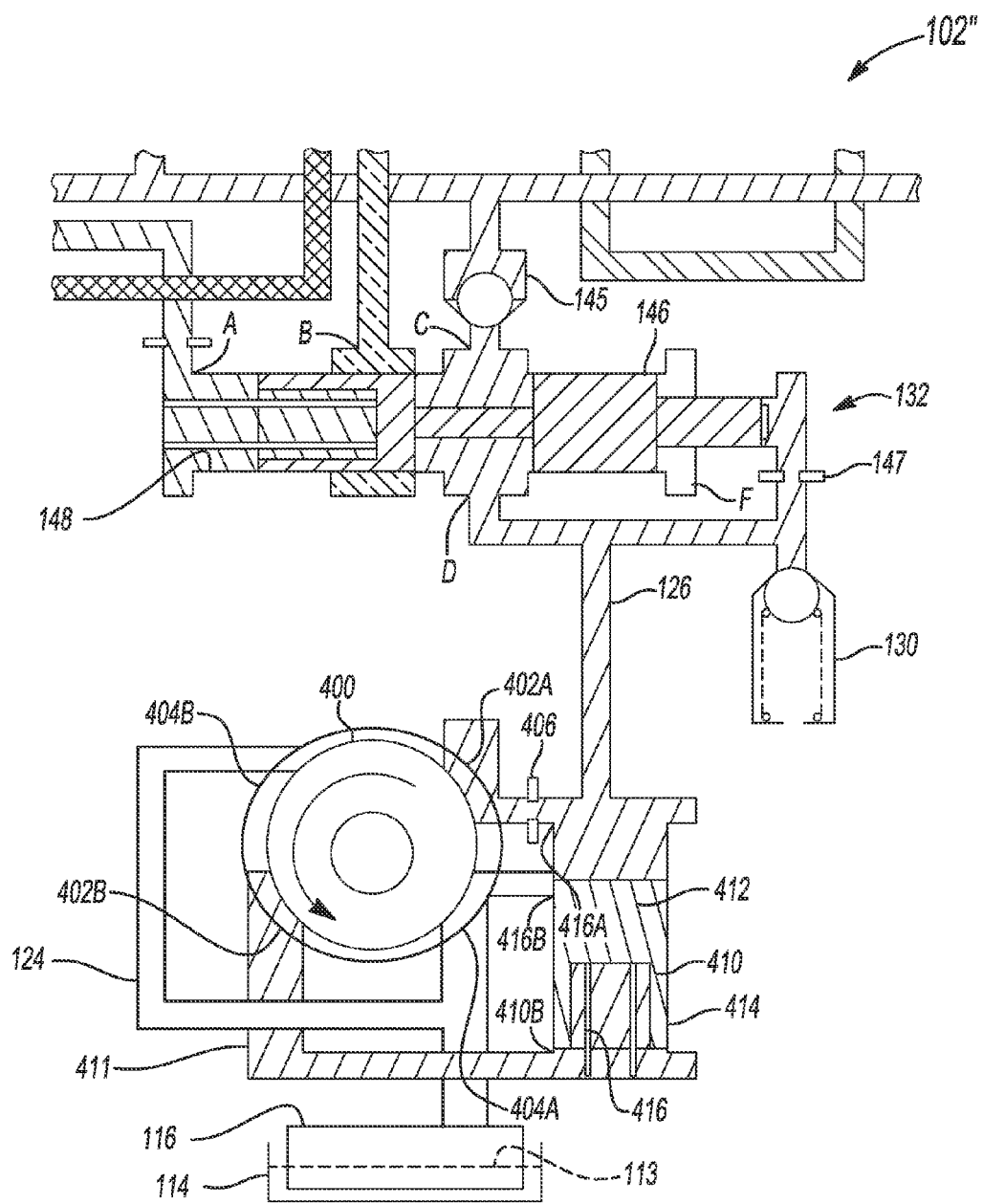
FIG. 3 is a diagram of a portion of another alternate embodiment of the hydraulic control system according to the principles of the present invention.

With reference to FIG. 3, another embodiment of a pressure regulator subsystem is generally indicated by reference number 102". The pressure regulator subsystem 102" shares common components with the pressure regulator subsystem 102 shown in FIG. 1 and therefore like components have been indicated by like reference numbers. However, in the pressure regulator subsystem 102", the return line 135 has been removed along with port 132E of the pressure regulator valve 132 and an alternate pump 400 is connected to the supply line 126. The pump 400 includes outlet ports 402A and 402B and inlet ports 404A and 404B. The inlet ports 404A and 404B communicate with the sump 114 via the suction line 124. The outlet ports 402A and 402B communicate through an orifice 406 to the supply line 126 and a release valve 410.

The release valve 410 includes a first inlet 410A, a second inlet 410B, and an outlet 410C. The first inlet 410A communicates with the supply line 126 and the outlet port 402A. The second inlet 410B communicates with the outlet port 402B via a signal line 411. The outlet 410C communication with the suction line 124. A piston 412 is slidably disposed within a bore 414 in the release valve 410. The first inlet 410A communicates with an opposite side of the piston 412 than the second inlet 410B. The outlet 410C is disposed between the first and second inlets 410A and 410B. A spring 416 biases the piston 412 towards the first inlet 410A.

When a force acting on the piston 412 by pressurized hydraulic fluid from the outlet 402A is greater than a combined force acting on the piston 412 by pressurized hydraulic fluid from the outlet 402B and the spring 416, the piston isolates the outlet 410C. As these forces balance, the piston 412 moves and selectively opens the outlet 410C to the first inlet 410A, thereby dumping hydraulic fluid back into the suction line 124 until a balance of forces exist on the piston 412.

It should be appreciated that other orifice and check ball arrangements can be used without departing from the scope of present invention, including a single orifice for fill and exhaust, or filling through a single orifice and exhausting through two orifices. Likewise while individual fluid lines have been described, it should be appreciated that fluid lines, flow paths, passageways, etc., may contain other shapes, sizes, cross-sections, and have additional or fewer branches without departing from the scope of the present invention.

The description of the invention is merely exemplary in nature and variations that do not depart from the general essence of the invention are intended to be within the scope of the invention. Such variations are not to be regarded as a departure from the spirit and scope of the invention

The invention claimed is:

1. A hydraulic control system for a powertrain in a motor vehicle, the powertrain having a torque converter with a torque converter clutch (TCC) connectable with a continuously variable transmission, the transmission having a primary moveable pulley and a secondary moveable pulley, the hydraulic control system comprising:
    a pressure regulator subsystem providing a pressurized hydraulic fluid;
    a pulley ratio control subsystem in downstream fluid communication with the pressure regulator subsystem and configured to control the pressurized hydraulic fluid to the primary moveable pulley and the secondary moveable pulley;
    a TCC regulator valve assembly in downstream fluid communication with the pressure regulator subsystem;
    a control valve assembly having a TCC apply port connected to an apply side of the TCC, a TCC release port connected to a release side of the TCC, a first feed port connected directly to the pressure regulator subsystem, and a second feed port connected directly to the TCC regulator valve assembly, the control valve assembly having a control spool moveable between an apply position and a release position, wherein in the apply position the TCC apply port communicates with the second feed port and in the release position the TCC release port communicates with the first feed port.

2. The hydraulic control system of claim 1 further comprising:
    a fault valve assembly having a first port in direct communication with a third feed port in the control valve assembly, a second port in direct communication with the pressure regulator subsystem and in direct communication with the first feed port of the control valve assembly, and an exhaust port, wherein the fault valve assembly includes a fault spool moveable between an open position and a closed position, wherein when in the open position the first port is in communication with the second port and when in the closed position the first port is in communication with the exhaust port, and
    wherein the third feed port of the control valve assembly is in communication with the TCC release port when the control valve is in both the apply position and the release position.

3. The hydraulic control system of claim 2 wherein the TCC regulator valve assembly includes an inlet port in downstream fluid communication with the pressure regulator subsystem and an outlet port in direct communication with the second feed port of the control valve assembly, and wherein the TCC regulator valve includes a regulator spool that moves to regulate the fluid pressure from the inlet port to the outlet port.

4. The hydraulic control system of claim 3 further comprising a TCC control solenoid in direct fluid communication with the control valve, the fault valve, and the regulator valve.

5. The hydraulic control system of claim 4 wherein a pressure signal from the TCC control solenoid moves the control valve to the apply position and the fault valve to the closed position, and wherein a first biasing member biases the control valve towards the release position and a second biasing member biases the fault valve towards the open position.

6. The hydraulic control system of claim 1 wherein the control valve assembly further includes a cooler port in direct communication with a cooler subsystem, and the cooler port is in communication with the first feed port when the control valve is in the apply position and wherein the cooler port is in communication with the TCC apply port when the control valve is in the release position.

7. The hydraulic control system of claim 1 wherein the pressure regulator subsystem includes an engine driven pump, a pressure regulator valve assembly in downstream fluid communication with the engine driven pump, and an accumulator.

8. The hydraulic control system of claim 7 wherein the pressure regulator valve assembly includes a main inlet port that receives pressurized hydraulic fluid from the engine driven pump, a TCC outlet port in direct communication with the first feed port of the control valve assembly, and a pressure regulator valve that controls the pressure of hydraulic fluid from the main inlet port to the TCC outlet port.

9. The hydraulic control system of claim 8 further comprising an accumulator solenoid disposed downstream of the accumulator, and wherein the accumulator solenoid and pressure regulator valve assembly are both in direct upstream fluid communication with the pulley ratio control subsystem.

10. The hydraulic control system of claim 9 wherein the pulley ratio control subsystem includes a primary pulley valve in upstream fluid communication with the primary moveable pulley and a secondary pulley valve in upstream fluid communication with the secondary moveable pulley.

11. The hydraulic control system of claim 10 further comprising:
    a primary pulley solenoid in direct communication with the primary pulley valve for controlling a position of the primary pulley valve; and
    a secondary pulley solenoid in direct communication with the secondary pulley valve for controlling a position of the secondary pulley valve.

12. The hydraulic control system of claim 11 further comprising a pressure regulator solenoid in direct communication with the pressure regulator valve for controlling a position of the pressure regulator valve.

13. The hydraulic control system of claim 11 further comprising a three-way check valve in direct downstream fluid communication with the primary pulley solenoid and the secondary pulley solenoid, wherein the three-way check valve has an outlet that communicates with the pressure regulator valve and a higher pressure of the pressurized hydraulic fluid from the primary pulley solenoid and the secondary pulley solenoid controls the position of the pressure regulator valve.

14. The hydraulic control system of claim 11 wherein the engine driven pump includes an outlet in communication with the pressure regulator valve assembly and with a bypass piston, a first inlet in communication with a sump, and a second inlet in communication with the bypass piston, wherein the bypass piston allows fluid communication from the outlet to the second inlet when a force acting on the bypass piston exceeds a threshold.

15. The hydraulic control system of claim 1 further comprising a clutch control subsystem for controlling a forward drive torque transmitting device and a reverse torque transmitting device, wherein the clutch control subsystem includes a forward actuator, a reverse actuator, and a manual valve disposed upstream of the forward and reverse actuators and downstream of the pressure regulator subsystem.

16. A hydraulic control system for a powertrain in a motor vehicle, the powertrain having a torque converter with a torque converter clutch (TCC) connectable with a continuously variable transmission, the transmission having a primary moveable pulley and a secondary moveable pulley, the hydraulic control system comprising:
   a pressure regulator subsystem providing a pressurized hydraulic fluid;
   a pulley ratio control subsystem in downstream fluid communication with the pressure regulator subsystem and configured to control the pressurized hydraulic fluid to the primary moveable pulley and the secondary moveable pulley;
   a TCC regulator valve assembly in downstream fluid communication with the pressure regulator subsystem;
   a control valve assembly having a TCC apply port connected to an apply side of the TCC, a TCC release port connected to a release side of the TCC, a first feed port connected directly to the pressure regulator subsystem, and a second feed port connected directly to the TCC regulator valve assembly, and a third feed port, the control valve assembly having a control spool moveable between an apply position and a release position, wherein in the apply position the TCC apply port communicates with the second feed port, in the release position the TCC release port communicates with the first feed port, and the third feed port of the control valve assembly is in communication with the TCC release port when the control valve is in both the apply position and the release position;
   a fault valve assembly having a first port in direct communication with the third feed port in the control valve assembly, a second port in direct communication with the pressure regulator subsystem and in direct communication with the first feed port of the control valve assembly, and an exhaust port, wherein the fault valve assembly includes a fault spool moveable between an open position and a closed position, wherein when in the open position the first port is in communication with the second port and when in the closed position the first port is in communication with the exhaust port.

17. A hydraulic control system for a powertrain in a motor vehicle, the powertrain having a torque converter with a torque converter clutch (TCC) connectable with a continuously variable transmission, the transmission having a primary moveable pulley and a secondary moveable pulley, the hydraulic control system comprising:
   an engine driven pump
   a pressure regulator valve assembly in downstream fluid communication with the engine driven pump
   an accumulator subsystem having an accumulator and an accumulator solenoid for selectively releasing a hydraulic fluid within the accumulator;
   a pulley ratio control subsystem in downstream fluid communication with the engine driven pump and the accumulator subsystem and configured to control the pressurized hydraulic fluid to the primary moveable pulley and the secondary moveable pulley;
   a TCC regulator valve assembly in downstream fluid communication with the pressure regulator valve assembly;
   a control valve assembly having a TCC apply port connected to an apply side of the TCC, a TCC release port connected to a release side of the TCC, a first feed port connected directly to the pressure regulator valve assembly, and a second feed port connected directly to the TCC regulator valve assembly, the control valve assembly having a control spool moveable between an apply position and a release position, wherein in the apply position the TCC apply port communicates with the second feed port and in the release position the TCC release port communicates with the first feed port.

18. The hydraulic control system of claim 17 wherein the pressure regulator valve assembly includes a main inlet port that receives pressurized hydraulic fluid from the engine driven pump, a TCC outlet port in direct communication with the first feed port of the control valve assembly, and a pressure regulator valve that controls the pressure of hydraulic fluid from the main inlet port to the TCC outlet port.

\* \* \* \* \*